United States Patent [19]

Porter, Jr. et al.

[11] 4,025,474

[45] May 24, 1977

[54] POLYESTER COATING COMPOSITIONS COMPRISING CROSS-LINKED POLYMERIC MICROPARTICLES

[75] Inventors: Samuel Porter, Jr., Tarentum; Bruce N. McBane, Gibsonia, both of Pa.

[73] Assignee: PPG Industries, Inc., Pittsburgh, Pa.

[22] Filed: June 2, 1975

[21] Appl. No.: 583,313

[52] U.S. Cl. .............................. 260/22 CQ; 260/21; 260/22 CB; 260/29.4 UA; 260/850
[51] Int. Cl.² .......................................... C09D 3/52
[58] Field of Search ........ 260/21, 22 CQ, 29.4 UA, 260/850, 22 CB

[56] References Cited

UNITED STATES PATENTS

| | | | |
|---|---|---|---|
| 2,591,904 | 4/1952 | Zola | 106/170 |
| 3,317,635 | 5/1967 | Osmond | 260/881 |
| 3,479,310 | 11/1969 | Dieterich et al. | 260/29.7 R |
| 3,481,891 | 12/1969 | Boylan et al. | 260/21 |
| 3,702,836 | 11/1972 | Walbridge | 260/29.1 R |
| 3,759,854 | 9/1973 | Chang et al. | 260/21 |
| 3,862,072 | 1/1975 | Sekmakas | 260/29.2 E |
| 3,872,040 | 3/1975 | Mollohan et al. | 260/21 |
| 3,888,945 | 6/1975 | Arndt et al. | 260/876 R |
| 3,920,595 | 11/1975 | Anderson et al. | 260/21 |

FOREIGN PATENTS OR APPLICATIONS

| | | | |
|---|---|---|---|
| 967,051 | 8/1964 | United Kingdom | 260/29.4 UA |

Primary Examiner—Ronald W. Griffin
Attorney, Agent, or Firm—Frank J. Troy

[57] ABSTRACT

Polyester coating compositions having improved application characteristics as well as other desirable properties are prepared by adding insoluble crosslinked polymeric microparticles to solutions or dispersions comprising oil-modified or oil-free polyester resins and aminoplast resins. The compositions may be spray coated onto various substrates in two coat applications to form coatings having improved film build, pattern control and flow control while maintaining the gloss characteristics of the film. These coatings are useful in general coating applications and are particularly useful in automotive finishing or refinishing.

24 Claims, No Drawings

POLYESTER COATING COMPOSITIONS COMPRISING CROSS-LINKED POLYMERIC MICROPARTICLES

BACKGROUND OF THE INVENTION

There are many fields in which it is desirable to use polyester coating compositions for purposes of protection and for aesthetic reasons.

For reasons of economy, it is important that such coating compositions be applied rapidly and efficiently. In particular, with the constant striving for higher productivity in industry, methods of applying coatings (e.g., paints) to yield a standard film thickness in two coats instead of three or more and which still produce a serviceable coating is clearly a desirable goal to those concerned with application of coatings in production.

In the automotive industry, for example, which is one of the important applications for polyester coatings, the problem of coating application acquires specific urgency. Competitive pressure requires the original production finishing of automobiles to make the most effective use of labor and materials. Economizing production line space and the capability of increasing speed of unit operations such as painting therefore become important. Topcoat finishing, for example, that can achieve the same protective film thickness and beauty with two spray applications when three or more are standard practice is regarded as a valuable modification.

Prior to this invention, commercial polyester enamel topcoats required at least three spray applications, particularly when pigmentation containing metallic flake, to deposit films of requisite thickness and appearance. This invention concerns the solution of the above-mentioned problems and, additionally, realizes further advantages to be mentioned below.

The invention is primarily concerned with improvement in polyester enamels such as increased efficiency of application, the ability to apply a satisfactory coating in two coats rather than three, and the achievement of high gloss and excellent metallic pattern control to give an aesthetically pleasing appearance.

It has now been found that the addition of insoluble crosslinked polymeric microparticles to solutions or dispersions of polyester resins results in compositions which are capable of being sprayed to a high film build in two coats with increased coating efficiency and the films formed have dramatically improved pattern control and resistance to solvent popping while film gloss is maintained. The ability to add such crosslinked polymeric microparticles to polyester coatings without decreasing gloss is unexpected and surprising since additives to such compositions heretofore generally exerted a dulling (i.e., flatting) effect on the film.

DETAILED DESCRIPTION OF THE INVENTION

The compositions of the invention contain as one component an oil-modified or oil-free polyester resin. The oil-modified or oil-free polyester resin is combined with the crosslinked polymeric microparticles, an aminoplast crosslinking agent and, if desired, other additives to provide coating compositions having the improved properties.

The term "oil-modified polyester" as used throughout this specification refers to resins produced by reacting a polyfunctional alcohol, i.e., a polyol, a polyfunctional acid (or acid anhydride) and an oil or oil fatty acid. These resins are variously referred to in the art as oil-modified polyesters or oil-modified alkyds.

A wide variety of such oil-modified polyesters may be employed in the compositions of this invention. Thus, oil-modified polyester resins having molecular weights ranging from about 1,000 to about 10,000 may be utilized in the compositions of the invention.

Polyols which may be utilized in preparing the oil-modified polyester resins are preferably polyols having from 3 to 10 hydroxyl groups or diols or a mixture of a polyol and a diol.

Typical polyols having 3 or more hydroxyl groups which may be employed include trimethylol propane, trimethylol ethane, pentaerythritol, dipentaerythritol, glycerin, sorbitol, mannitol, hexanetriol and the like. A wide variety of diols may be employed. Typical of the many diols which may be employed are alkylene glycols, such as ethylene glycol, propylene glycol, butylene glycol, hexylene glycol and neopentyl glycol and other glycols such as hydrogenated Bisphenol A, cyclohexane dimethanol, caprolaactone and ethylene glycol, hydroxyalkylated bisphenols, polyether glycols, for example, poly(oxytetramethylene)glycol and the like.

The oil-modified polyester resin will also contain a polyfunctional acid constituent, preferably an aromatic dicarboxylic acid such as phthalic acid, isophthalic acid, terephthalic acid, tetrahydrophthalic acid, hexahydrophthalic acid, and the like, or a saturated aliphatic dicarboxylic acid such as succinic, glutaric, adipic, pimelic, suberic, azelaic, brassic, dodecandoic and the like. The oil-modified polyester resin may also advantageously contain a minor amount of a monobasic acid constituent such as benzoic acid, a substituted benzoic acid or a similar monobasic aromatic acid. In addition, there may also be employed higher polycarboxylic acids such as trimellitic acid and tricarballylic acid (where acids are referred to above, it is understood that the anhydrides of those acids which form anhydrides can be used in place of the acid.) It is preferred that the oil-modified polyester contain an aliphatic dicarboxylic acid as at least part of the acid component.

The oil employed in preparing the oil-modified polyester can be a non-drying saturated oil such as coconut oil, cottonseed oil, peanut oil, olive oil and the like, or a drying or semi-drying oil, such as linseed oil, tall oil, soya oil, safflower oil, perilla oil, tung oil, oiticica oil, poppyseed oil, sunflower oil, dehydrated castor oil, herring oil, menhadan oil, sardine oil and the like. The above oils can be used per se or in the form of an oil fatty acid.

The oil-modified polyester resin is produced by methods well known in the polyester resin art employing conventional techniques and procedures. Thus, for example, the oil-modified polyester can readily be prepared by the simple interaction of a mixture of a polyfunctional alcohol (i.e., polyol or diol or mixture thereof), a polyfunctional acid (or acid anhydride) and an oil or oil fatty acid. Where the oil per se is employed, it becomes necessary as is well known in the art, to first convert the oil to a mono- or diglyceride by alcoholysis with glycerol before adding the acid or acid anhydride and esterifying.

As will be recognized, the type and amounts of the various components which make up the oil-modified polyester resin can be varied widely, depending upon the physical characteristics desired in the resin. Thus, the oil-modified polyester can be prepared in such a manner that it exhibits both carboxyl and hydroxyl functionality or substantially only carboxyl functionality or essentially no functionality at all. The term "functionality" as used herein refers to the number of reactive hydroxyl and carboxyl groups per molecule, with anhydride groups being considered as equivalent to two carboxyl groups. It will be noted that certain compounds contain both hydroxyl and carboxyl groups, e.g., 6-hydroxyhexanoic acid, 8-hydroxyoctanoic acid, tartaric acid, etc.

The preferred oil-modified polyester resins employed in the compositions of this invention are those having substantial hydroxyl functionality so that crosslinking with aminoplast resins may be readily accomplished. As is well known in the art, hydroxyl functional polyester resins may be readily prepared by reacting an excess of the polyfunctional alcohol constituent with the polyfunctional acid constituent. The preferred oil-modified polyester resins employed in compositions of this invention may have hydroxyl values ranging from about 10 to about 200, more preferably from 40 to 120 and acid values ranging from about 0.1 to about 50, more preferably from 2 to 20.

As will be described below, it may in certain cases be desirable to form salt groups in the above-described oil-modified polyesters for purposes of water dispersibility. In that event, it may be desirable to include a somewhat higher proportion of acid constituent in the polyester.

As indicated, the resin component of the compositions of this invention may alternatively be an oil-free polyester resin. A wide variety of such oil-free polyester resins may be utilized in the compositions of the present invention. Thus, virtually any oil-free polyester resin prepared by the polyesterification of organic polycarboxylic acids or anhydrides thereof with organic polyols utilized heretofore in the coatings industry may be utilized in the compositions of the invention. The preferred oil-free polyester resins are those having molecular weights ranging from 1,000 to 10,000.

The oil-free polyester produced can be prepared from those polyols utilized in the preparation of conventional polyesters. Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, tetramethylene glycol, 2,3-dihydroxybutane, 1,4-dihydroxybutane, 1,4-dihydroxy-2-ethylbutane, 1,6-dihydroxyhexane, 1,3-dihydroxyoctane, 2,10-dihydroxydecane, 1,4-dihydroxycyclohexane, 2,2-diethylpropanediol-1,3, 2,2-diethylbutanediol-1,3, 4,5-dihydroxynonane, pentamethylene glycol, heptamethylene glycol, decamethylene glycol, butene-2-diol-1,4, 2,7-dihydroxy-n-hexane-4,2-ethylhexanediol-1,3, glycerol, 1,2,6-hexanetriol, pentaerythritol, sorbitol, mannitol, methyl glycoside, 2,2-bis(hydroxyethoxyphenyl)propane, 2,2-bis(betahydroxypropoxyphenyl)propane, 2-hydroxyethylhydroxyacetate, 1,1-bi(hydroxymethyl)nitroethane, and the like. Additionally, polyether polyols may be utilized, such as, for example, poly(oxyethylene)glycol, poly(oxytetramethylene)glycol, poly(oxypentanethylene)glycol and the like.

Particularly useful polyols include diols and triols. Generally, the diol component includes glycols of the formula $HO(CH_2)_nOH$ wherein $n$ equals 2 to 10, glycols of the formulas $HO(CH_2CH_2O)_nH$ and $HO[CH(CH_3)CH_2O]_nH$ in which $n$ equals 1 to 10, such as ethylene glycol, diethylene glycol, and the like, 2,2-dimethyl-1,3-propanediol, 2,2-diethyl-1,3-propanediol, 3-methyl-1,5-pentanediol, 1,6-hexanediol, N-methyl and N-ethyl diethanolamines. Others include 4,4'-methylenebiscyclohexanol, 4,4'-isopropylidenebiscyclohexanol and various xylenediols, hydroxymethylphenylethyl alcohols, hydroxymethylphenylpropanols, phenylenediethanols, phenylenedipropanols and heterocyclic diols such as 1,4-piperazine diethanol and the like. Some of the preferred diols include 2-methyl-2-ethyl-1,3-propanediol, 2-ethyl-1,3-hexanediol, 1,6-hexanediol and 2,2-dimethyl-3-hydroxypropyl, 2,2-dimethyl-3-hydroxypropionate and the like. The preferred triols (trifunctional polyols) are trimethylolpropane; trimethylolethane, 1,2,3-propanetriol, 1,2,4-butanetriol; 1,2,6-hexanetriol, and the like.

A wide variety of polycarboxylic acids can be reacted with the above-described polyols to form the oil-free polyester resins. Virtually any of the polycarboxylic acids conventionally employed in oil-free polyester resins may be employed. Thus, acids such as maleic, fumaric, itaconic, propionic, citraconic, isobutyric, trans-crotonic, mesaconic, acetylene dicarboxylic, aconitic, alpha-methyl itaconic, alpha, alpha dimethyl itaconic, oxalic, malonic, succinic, adipic, glutaric, brassic, dodecandoic, sebacic, 2-methylsuccinic, pimelic, 2,3-dimethyl succinic, suberic, hexyl succinic, azelaic, 3,3-diethyl glutaric, 3,3-dimethyl glutaric, 2,2-dimethyl glutaric, 2,2-dimethyl succinic, phthalic, isophthalic, terephthalic, tetrahydrophthalic, hexahydrophthalic, trimellitic, tricarballylic, and the like may be utilized. Anhydrides of these acids, where they exist, can be employed and are encompassed by the term "polycarboxylic acid".

The preferred polycarboxylic acids which can be utilized in preparing the oil-free polyester resin component of the compositions of this invention are the aromatic dicarboxylic acids such as phthalic, isophthalic, terephthalic, tetrahydrophthalic, hexahydrophthalic and the like, or the saturated aliphatic dicarboxylic acids such as succinic, glutaric, adipic, pimelic, suberic, azelaic, brassic, dodecandoic and the like.

As in the case of the oil-modified polyesters, the oil-free polyester resins employed in the compositions of the invention are preferably those having hydroxyl functionality. Thus, the oil-free polyester resin may have hydroxyl values ranging from about 10 to about 200, and acid values ranging from about 0.1 to about 50.

As indicated above, the improved coating compositions of this invention are prepared by the addition of aminoplast resin (described hereinafter) crosslinking agents and insoluble crosslinked polymeric microparticles (hereinafter described) to solutions or dispersions of the abovedescribed oil-modified or oil-free polyester resins.

The solvents employed in forming such solutions and dispersions are well known and may be any of those conventionally employed in the polyester or alkyd resin coatings art. Accordingly, any solvent or solvent mixture in which the polyester resin and aminoplast resin are compatible and soluble and/or dispersible to the desired extent may be utilized. When water is desired to be utilized as the solvent medium, it is often preferable and well known to include in the polyester resin salt groups which impart the desired degree of solubility or dispersibility in water. Such a technique directed to polyurethane resins but also applicable herein is described in U.S. Pat. No. 3,479,310 to Dieterich et al. Thus, in the compositions of this invention, the liquid medium containing the oil-modified or oil-free polyester resins may be either organic solvent-based or aqueous based or may consist of mixtures of water miscible organic solvents and water.

In addition, the coating compositions of the invention may have varying solids contents. Thus, the compositions herein may be relatively low in solids (e.g., 10 to 30 percent by weight), moderate in solids content (e.g., 30 to 55 percent by weight) or high in solids content (e.g., 60 percent by weight or higher).

One convenient method of preparing high solids content coating compositions which is applicable to this invention is to blend the oil-free or oil-modified polyester resin, the aminoplast resin and the cross-linked polymeric microparticles with a low molecular weight polyol which may be either a polyether or polyester polyol. In this situation, the low molecular weight polyol serves as a reactive diluent which replaces a portion of the solvent medium and yet, by virtue of its hydroxyl functionality and the hydroxyl functionality of the polyester, can be crosslinked by the aminoplast resin and thereby incorporated into the film formed by curing the coating composition. Such a technique is illustrated in copending applications Ser. No. 301,034 and 459,515, filed Oct. 26, 1972 and Apr. 10, 1974, respectively, assigned to Applicants' assignee and in U.S. Pat. No. 3,862,072 to Sekmakas et al, issued Jan. 21, 1975, incorporated herein by reference.

Aminoplast resin crosslinking agents employed in the compositions of the invention are well known in the art. Aminoplast resins which can suitably be employed for this purpose include amine-aldehyde resins, i.e., an aldehyde condensation product of melamine, urea, acetoguanamine, or a similar compound. Generally, the aldehyde employed is formaldehyde, although the products can be made from other aldehydes, such as, for example, acetaldehyde.

While resins produced from melamine or urea are most common and are preferred, condensation products of other amines and amides can also be employed, such as, for example, those of triazines, diazines, triazoles, guanidines, guanamines, and alkyl and aryl-substituted derivatives of such compounds, including alkyl and aryl-substituted melamine, provided at least one amino group is present. Some examples of such compounds are N,N'-dimethylurea, benzyl urea, dicyandimide, formoguanamine, benzoguanamine, ammeline, 2-chloro-4,6-diamino-1,3,5-triazine, 2-phenyl-4-amino-6hydroxy-1,3,5-triazine, 3,5-diaminotriazole, triaminopyrimidine, 2-mercapto-4,6-diaminopyrimidine, 2,4,6-trihydrazine-1,2,5-triazine, 2,4,6-triethyltriamine-1,3,5-triazine, 2,4,6-triphenyltriamino-1,3,5-triazine, and the like.

These aldehyde condensation products contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose, including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; monoethers of glycols, such as the Cellosolves and Carbitols; and halogen-substituted or other substituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Some of the preferred aldehyde condensation products of melamine include hexamethoxymethyl melamine, hexakis(methoxymethyl)melamine, ethoxymethoxymethyl melamine, hexylated methylated methylol melamine and the like.

The aminoplast crosslinking agent may comprise up to about 60 percent by weight of the coating composition and, in many cases, preferably comprises from about 4 to about 50 percent by weight of the coating composition.

As indicated, insoluble crosslinked polymeric microparticles are added to the above-described oil-modified or oil-free polyester resins and aminoplast resins to form the improved coating compositions of the invention.

The crosslinked polymeric microparticles employed in the compositions herein are prepared by the free radical addition copolymerization of at least one ethylenically unsaturated monomer with an alpha, beta-ethylenically unsaturated monocarboxylic acid and a cross-linking monomer selected from the group consisting of epoxy group-containing compounds, alkylenimines, organoalkoxysilanes and mixtures thereof in the presence of a dispersion stabilizer and a dispersing liquid in which the crosslinked polymer particles are insoluble, thereby forming a non-aqueous dispersion of the crosslinked polymer microparticles of relatively high concentration. For a detailed description of the preferred crosslinked polymeric microparticles and their method of preparation, reference may be had to copending application Ser. No. 559,949, filed Mar. 19, 1975, in the names of Joseph M. Makhlouf and Samuel Porter, Jr.

The crosslinked polymeric microparticles utilized in the compositions of the present invention are formed by the free radical addition copolymerization of an alpha, beta-ethylenically unsaturated monocarboxylic acid, at least one other copolymerizable ethylenically unsaturated monomer and a crosslinking monomer which can be an epoxy-group containing compound, an alkylenimine, an organoalkoxysilane, or a mixture thereof, in the presence of a dispersing liquid which is a solvent for the polymerizable monomers but a nonsolvent for the resultant polymer and a dispersion stabilizer. The dispersion stabilizer employed in producing the microparticles utilized in the invention is a compound, usually polymeric, which contains at least two segments of which one segment is solvated by the dispersing liquid and a second segment is of different polarity than the first segment and is relatively insoluble (compared to the first segment) in the dispersing liquid.

Included among such dispersion stabilizers are polyacrylates and polymethacrylates, such as poly(lauryl methacrylate) and poly(2-ethylhexyl acrylate); diene polymers and copolymers such as polybutadiene and degraded rubbers; aminoplast resins, particularly highly naphthatolerant compounds such as melamine-formaldehyde resins etherified with higher alcohols (e.g., alcohols having 4 to 12 carbon atoms), for example, butanol, hexanol, 2-ethylhexanol, etc.; and other aminoplasts of similar characteristics such as certain resins based on urea, benzoguanamine and the like; and various copolymers designed to have the desired characteristics, for example, polyethylene-vinyl acetate copolymers.

Commonly utilized microparticles contain from about 0.5 to about 15 percent by weight of each of the acid monomer and the crosslinking monomer and are formed from the copolymerization of an alkyl acrylate or methacrylate monomer, such as methyl acrylate, ethyl acrylate, propyl acrylate, butyl acrylate, methyl methacrylate, ethyl methacrylate, propyl methacrylate, butyl methacrylate, or the like; an alpha, beta-ethylenically unsaturated monocarboxylic acid monomer such as acrylic acid or methacrylic acid; and an epoxy group-containing monomer such as glycidyl acrylate, glycidyl methacrylate or the like. The dispersing liquid is ordinarily an aliphatic hydrocarbon, and the preferred dispersion stabilizers are graft copolymers containing two polymer segments of which one segment is an anchor polymer of different polarity to said first segment and is relatively non-solvatable by the dispersing liquid, wherein said dispersion stabilizer contains pendant groups which have been addition copolymerized with said ethylenically unsaturated monomers. In the preparation of such polymeric microparticles, methyl methacrylate, methacrylic acid and glycidyl methacrylate are the especially preferred monomers.

A particularly preferred crosslinked polymeric microparticle for use in the compositions of the invention is a crosslinked microparticle formed by the free radical addition copolymerization of an alkyl acrylate or methacrylate; an alpha, beta-ethylenically unsaturated monocarboxylic acid; a hydroxyalkyl alkylenimine, and an organoalkoxysilane monomer; in the presence of the aliphatic hydrocarbon dispersing liquid and the above dispersion stabilizer. In preparing the particularly preferred microparticle, methyl methacrylate, methacrylic acid, hydroxyethyl ethylenimine, and gamma-methacryloxypropyltrimethoxysilane are especially preferred monomers.

As indicated above and as described in the copending application which has been incorporated herein by reference, the crosslinked polymeric microparticles are prepared in the form of a non-aqueous dispersion of relatively high concentration. They generally have a particle size range of about 0.1 to about 10 microns. The crosslinked microparticles utilized herein can be added to the solution or dispersion of oil-free or oil-modified polyester resin and the aminoplast crosslinking agent in several ways. Thus, the non-aqueous dispersion of crosslinked microparticles can be directly added to the solution of the resin. If this method is employed, it is most convenient and preferred for purposes of compatibility and ease of mixing to first reduce or cut the dispersion with the same solvent utilized in the solution or dispersion of polyester and aminoplast resins. Alternatively, the non-aqueous dispersion of crosslinked polymeric microparticles can be recovered, such as by spray drying with a conventional spray drier to form a finely-divided powder which can then be redispersed in the same type solvent or solvent mixture employed in the solution or dispersion of polyester and aminoplast resins and then added thereto, or in cases where pigmentation is desired the powder itself can be added in with the grind vehicle.

In most cases, the overall composition may contain from about 30 percent to about 90 percent by weight of the oil-modified or oil-free polyester resin, from about 4 percent to about 60 percent by weight of the aminoplast crosslinking agent, and from about 2 percent to about 50 percent by weight, preferably 2 to 20 percent by weight of the crosslinked polymeric microparticles.

The compositions may also contain other ingredients such as catalysts, plasticizers, fillers, pigments and the like. This invention is particularly useful in the deposition of films containing metallic flake pigments such as aluminum, nickel, stainless steel, or the like, as the pattern control of the resulting film is excellent.

The compositions are quite useful as coatings on substrates. The compositions are applied to the substrate and baked at 150° F. to 350° F. for about 5 to about 60 minutes to cure the coating on the substrate. The coatings may be applied by any conventional means such as spray coating, dip coating, roll coating, and the like. The preferred method is spray coating as the compositions containing crosslinking polymeric microparticles can be applied with good deposition efficiency and rapid film build.

Any substrate such as paper, metal, wood, paperboard, plastic, foam, extruded rubber, and the like may be coated with the composition.

The following examples set forth specific embodiments of the instant invention. However, the invention is not to be construed as being limited to these embodiments for there are, of course, numerous possible variations and modifications. All parts and percentages in the Examples as well as throughout the specification are by weight unless otherwise indicated.

EXAMPLE A

This example illustrates the preparation of a preferred type of crosslinked polymeric microparticles for use in the compositions of this invention.

To a 5-liter flask equipped with an up and over condenser, agitator, thermometer and heating mantle were charged 1250 grams of heptane, 540 grams of Isopar H (a mixed aliphatic hydrocarbon having an initial boiling point of 350° F. and a dry point of 371° F. with 90 percent distilling between 353°–357° F., available from Humble Oil and Refining Company), 50 grams of methyl methacrylate, 10 grams of a dispersion stabilizer comprising a 50.3 percent solids solution of 45.4 percent methyl methacrylate, 4.2 percent glycidyl methacrylate, 0.9 percent methacrylic acid, and 49.5 percent of a reaction product of 89.2 percent poly-12-hydroxystearic acid and 10.8 percent glycidyl methacrylate in a solvent mixture comprising 52.1 percent butyl acetate, 40.0 percent VM&P naphtha, and 7.9 percent toluene and 4 grams of azobis(isobutyronitrile). The mixture was heated to reflux (about 103° C.) and held for about 30 minutes. Then over a period of about 3 hours were added 1288 grams of methyl methacrylate, 70 grams of glycidyl methacrylate, 42 grams of methacrylic acid, 4.2 grams of Armeen DMCD (dimethyl cocamine, available from Armour Chemical Company), 200 grams of the above dispersion stabilizer, 14 grams of octyl mercaptan and 5.6 grams of azobis(isobutyronitrile). After this addition was completed, reflux was continued for an additional 30 minutes and then an additional 2.8 grams of azobis(isobutyronitrile) were added. Reflux was then continued for another one hour and the mixture was then cooled and filtered.

The resultant polymeric dispersion consisting essentially of crosslinked polymeric microparticles had a total solids content determined at 150° C. of 44.9 percent by weight.

EXAMPLES 1-2

These examples illustrate the effect of adding the crosslinked polymeric microparticles to an oil-modified polyester. In these examples, a control composition comprising an aluminum pigmented oil-modified polyester coating composition (Example 1) and a test composition (Example 2) having substantially the same composition except that it contained approximately 10 percent by weight solids of crosslinked polymeric microparticles of Example A, were prepared using standard polyester coating composition mixing procedures. The compositions had the following formulations:

| Ingredients | Parts by Weight | |
|---|---|---|
| | Ex. No. 1 | Ex. No. 2 |
| | (Control) | |
| Oil-modified polyester resin (1) | 125.0 | 110.0 |
| Pigment paste (2) | 10.0 | 10.0 |
| Butylated melamine formaldehyde | 41.0 | 41.0 |
| Xylene | 30.0 | 75.0 |
| Crosslinked polymeric microparticle dispersion of Example A | — | 22.0 |
| Total | 206.0 | 258.0 |

(1) A 60 percent solids solution of an oil-modified polyester resin having a hydroxyl value of 76, an acid value of 9, and a Gardner-Holdt viscosity of V-X, prepared by reacting a monomer mixture consisting of 33.8 percent coconut oil, 38.3 percent phthalic anhydride, 2.4 percent tertiary butyl benzoic acid, 21.6 percent pentaerythritol and 20.9 percent trimethylolethane in a solvent mixture consisting of 91 percent xylene and 9 percent n-butanol.
(2) A pigment paste consisting of 23.7 percent aluminum flake, 5.9 percent phthalocyanine blue, 16.2 percent methyl-12-hydroxystearate, 27.1 percent VM&P naphtha and 27.1 percent methyl ethyl ketone. The paste was prepared in conventional manner by grinding on a ball mill until the particles had a fineness of 7.5 Hegman.

The above compositions were reduced to 40 percent total solids with xylene and sprayed onto metal substrates. Example 1, the control composition, showed poor metallic pattern control while Example 2, the composition containing the crosslinked polymeric microparticles showed excellent metallic pattern control.

EXAMPLES 3-4

These examples illustrate the effect of adding the crosslinked polymeric microparticles to oil-free polyester resin coating composition. In these examples, a control composition comprising an aluminum pigmented oil-free polyester coating composition (Example 3) and a test composition (Example 4) having substantially the same composition except that it contained approximately 10 percent by weight solids of the crosslinked polymeric microparticles of Example A, were prepared utilizing standard polyester coating composition mixing procedures. The compositions had the following formulations:

| Ingredients | Parts by Weight | |
|---|---|---|
| | Ex. No. 3 | Ex. No. 4 |
| | (Control) | |
| Oil-free polyester resin (1) | 125.0 | 108.0 |
| Pigment paste of Examples 1 and 2 | 10.0 | 10.0 |
| Methylolated melamine formaldehyde | 31.0 | 31.0 |
| Crosslinked polymeric microparticle dispersion of Example A | — | 22.0 |
| 1 percent SF1023 (anti-cratering agent) (2) | 4.0 | 4.0 |
| p-toluene sulfonic acid | 2.0 | 2.0 |
| Methyl-n-butyl ketone | 86.0 | 81.0 |
| Total | 258.0 | 258.0 |

(1) A 60 percent solids solution of an oil-free polyester resin having a hydroxyl value of 74, an acid value of 4 and a Gardner-Holdt viscosity of R prepared by reacting a monomer mixture consisting of 28.6 percent 1,6-hexanediol, 19.6 percent adipic acid, 33.4 percent isophthalic acid, 18.0 percent trimethylolpropane and 0.4 percent hydroxyethyl ethylenimine in a solvent mixture consisting of 82.0 percent methyl n-butyl ketone and 18.0 percent toluene.
(2) A 1 percent solution of silicone in toluene available from the General Electric Corporation.

The above compositions were reduced 50 percent by volume to spray using a solvent mixture consisting of 75 percent xylene, 10 percent n-butanol and 15 percent Cellosolve acetate and sprayed onto metal substrates. Example 3, the control composition, showed poor metallic pattern control while Example 4, the composition containing the crosslinked polymeric microparticles, showed excellent metallic pattern control.

We claim:

1. In a polyester coating composition comprising a solution or dispersion of a hydroxyfunctional oil-modified or oil-free polyester resin and an aminoplast resin, the improvement which comprises the addition thereto of from about 2 percent to about 50 percent of crosslinked polymeric microparticles formed by the free radical addition copolymerization of from about 0.5 percent to about 15 percent of an alpha, beta-ethylenically unsaturated monocarboxylic acid, at least one other copolymerizable ethylenically unsaturated monomer, and from about 0.5 percent to about 15 percent of a crosslinking monomer selected from the group consisting of epoxy group-containing compounds, alkylenimines, organo-alkoxysilanes and mixtures thereof in the presence of a dispersing liquid which is a solvent for the polymerizable monomers but a non-solvent for the resultant polymer, and a dispersion stabilizer containing at least two segments of which one segment is solvated by said dispersing liquid and a second segment is of different polarity than said first segment and is relatively insoluble in said dispersing liquid.

2. The composition of claim 1 wherein the oil-modified or oil-free polyester resin has a molecular weight of from about 1,000 to about 10,000.

3. The composition of claim 1 wherein the oil-modified or oil-free polyester resin has a hydroxyl value of from about 10 to about 200 and an acid value of from about 0.1 to about 50.

4. The composition of claim 1 wherein the oil-modified or oil-free polyester resin comprises from about 30 to about 90 percent by weight of the total composition.

5. The composition of claim 1 wherein the oil-modified polyester resin is the reaction product of coconut oil, phthalic anhydride, p-tertiary butyl benzoic acid, pentaerythritol, and trimethylolethane.

6. The composition of claim 1 wherein the oil-free polyester resin is the reaction product of isophthalic acid, sebacic acid, hydroxyethyl ethylenimine, neopentyl glycol and trimethylolpropane.

7. The composition of claim 1 wherein the aminoplast resin is an etherified alklolated amine aldehyde resin.

8. The composition of claim 7 wherein the aminoplast resin is butylated melamine formaldehyde resin.

9. The composition of claim 1 wherein the aminoplast resin comprises from about 4 to about 60 percent by weight of the total composition.

10. The composition of claim 1 wherein the liquid medium of said composition is organic solvent-based.

11. The composition of claim 1 wherein the liquid medium of said composition comprises a mixture of a water-miscible organic solvent and water.

12. The composition of claim 1 wherein the liquid medium of said composition is water or a mixture of a water-miscible organic solvent and water and said oil-free or oil-modified polyester resins contain salt groups.

13. The composition of claim 1 wherein said alpha, betaethylenically unsaturated monocarboxylic acid is acrylic acid or methacrylic acid.

14. The composition of claim 1 wherein said other copolymerizable ethylenically-unsaturated monomer is an alkyl acrylate or alkyl methacrylate.

15. The composition of claim 1 wherein said other copolymerizable ethylenically-unsaturated monomer is methyl methacrylate.

16. The composition of claim 1 wherein the crosslinking monomer is an epoxy group-containing compound.

17. The composition of claim 16 wherein the epoxy group-containing compound is glycidyl methacrylate.

18. The composition of claim 1 wherein the crosslinking monomer is a mixture of monomers consisting of an alkylenimine and an organo-alkoxysilane.

19. The composition of claim 18 wherein the alkylenimine is hydroxyethyl ethylenimine and the organo-alkoxysilane is gammamethacryloxypropyltrimethoxysilane.

20. The composition of claim 1 wherein the dispersion stabilizer is a graft copolymer containing two polymeric segments of which one segment is solvated by said dispersing liquid and the second segment is an anchor polymer of different polarity to said first segment and is relatively non-solvatable by said dispersing liquid and wherein said dispersion stabilizer contains pendant groups which have been addition copolymerized with said ethylenically unsaturated monomers.

21. The composition of claim 20 wherein the dispersion stabilizer is formed by graft copolymerizing the reaction product of glycidyl methacrylate and poly-(12-hydroxystearic acid), with methyl methacrylate and glycidyl methacrylate and the resulting copolymer product containing pendant epoxy groups is reacted with methacrylic acid.

22. The composition of claim 1 wherein said monocarboxylic acid is methacrylic acid, said other ethylenically unsaturated monomer is methyl methacrylate, and said crosslinking monomer is glycidyl methacrylate.

23. The composition of claim 1 wherein said monocarboxylic acid is methacrylic acid, said other ethylenically unsaturated monomer is methyl methacrylate and said crosslinking monomer is a mixture of gamma-methacryloxypropyltrimethoxysilane and hydroxyethyl ethylenimine.

24. The composition of claim 1 further containing a low molecular weight polyether or polyester polyol.

* * * * *